United States Patent
Arias Vidal et al.

(10) Patent No.: US 7,308,165 B2
(45) Date of Patent: Dec. 11, 2007

(54) OPTICAL TRANSDUCER AND METHOD FOR THE SIMULTANEOUS MEASUREMENT OF PRESSURE AND TEMPERATURE IN OIL AND GAS WELLS

(75) Inventors: Jose Luiz Arias Vidal, Rio de Janeiro RJ (BR); Manoel Felician da Silva Júnior, Rio de Janeiro RJ (BR); Ricardo Munoz Freitas, Rio de Janeiro RJ (BR); Arthur Martins Barbosa Braga, Rio de Janeiro RJ (BR); Luiz Carlos Guedes Valente, Rio de Janeiro RJ (BR); Rogério Dias Regazzi, Rio de Janeiro RJ (BR); Alexandre Sant'Anna Ribeiro, Rio de Janeiro RJ (BR); Lincoln Homero Thomé Ferreira, Rio de Janeiro RJ (BR); Joao Luiz dos Santos Lorenzo, Rio de Janeiro RJ (BR)

(73) Assignee: Petroleo Brasileiro S.A. - Petrobras (BR)

( * ) Notice: Subject to any disclaimer, the term of this patent is extended or adjusted under 35 U.S.C. 154(b) by 125 days.

(21) Appl. No.: 11/191,243

(22) Filed: Jul. 28, 2005

(65) Prior Publication Data

US 2006/0034559 A1    Feb. 16, 2006

(30) Foreign Application Priority Data

Aug. 10, 2004    (BR)    .................... 0403240

(51) Int. Cl.
G02B 6/00    (2006.01)

(52) U.S. Cl. ......................................... 385/13; 385/37
(58) Field of Classification Search ..................... None
See application file for complete search history.

(56) References Cited

U.S. PATENT DOCUMENTS

| | | | |
|---|---|---|---|
| 6,016,702 A | 1/2000 | Maron | |
| 6,276,215 B1 * | 8/2001 | Berg | ........................... 73/800 |
| 6,278,811 B1 | 8/2001 | Hay et al. | |
| 6,439,055 B1 | 8/2002 | Maron et al. | |
| 6,519,388 B1 | 2/2003 | Fernald et al. | |
| 6,668,656 B2 | 12/2003 | Fernald et al. | |
| 6,888,972 B2 * | 5/2005 | Berg et al. | ..................... 385/12 |
| 6,898,339 B2 * | 5/2005 | Shah et al. | ................... 385/13 |
| 6,913,079 B2 | 7/2005 | Tubel | |

* cited by examiner

*Primary Examiner*—Michelle Connelly-Cushwa
*Assistant Examiner*—Jerry T Rahll
(74) *Attorney, Agent, or Firm*—Nixon & Vanderhye PC (57) ABSTRACT

An optical transducer 100, 200 and method for the simultaneous measurement of downhole pressure and temperature in a single- or multi-point configuration including a body 10a/10b with an elastic membrane 50 onto which at least one Bragg grating 60a/60b is attached, and at least an additional Bragg grating 60b/60a contained on the same optical fiber 30. The elastic membrane 50 conveys strain proportional to the pressure and temperature conditions to which is submitted said transducer to at least one Bragg grating 60a/60b, the portion of light not reflected by the Bragg gratings 60a, 60b continues along the remaining of the optical fiber 30.

18 Claims, 5 Drawing Sheets

OPTICAL TRANSDUCER AND METHOD FOR THE SIMULTANEOUS MEASUREMENT OF PRESSURE AND TEMPERATURE IN OIL AND GAS WELLS

CROSS REFERENCE TO RELATED APPLICATION

This application is based upon, claims the benefit of, priority of, and incorporates by reference, the contents of Brazilian Patent Application No. PI 0403240-3 filed Aug. 10, 2004.

FIELD OF THE INVENTION

The present invention relates to an optical transducer for the simultaneous measurement of pressure and temperature in oil and gas wells, more specifically, to an optical transducer that uses, for such measurement, at least two Bragg gratings in a same optical fiber, at least one of such fibers being attached onto an elastic membrane. The invention also relates to a method for the simultaneous measurement of pressure and temperature in oil and gas wells using the described transducer.

BACKGROUND INFORMATION

Among the commercially available sensor technologies useful for downhole monitoring of pressure, temperature and other parameters are the Permanent Downhole Gage (PDG's) using quartz crystal technology and the Strain Gage the features of which are: require on-board electronics, are active sensors, show low reliability and higher than 3 psi/year drift in the measurement. Such equipment undergo electromagnetic interference, do not allow distributed installation (multiplexed) and are costly. For applications required to outweigh such specifications, the optical technology is the most recommended to overcome such problems.

In view of the high cost of well intervention and production interruption, the system installed in the well should have a high reliability (of at least twenty years). Optical sensor technology makes it possible to attain such a requirement.

Optical fibers bear some features such as: they can withstand high temperatures (silica up to 1,000° C.), show high transmission rates and low losses at high distances (relating to the attenuation of transmitted/received signal), as well as electrical insulation and no electromagnetic interference.

That is why it is said that optical sensors have several benefits relative to commercially available sensors, such as low hysteresis, repeatability, reproducibility, mechanical strength, twenty years working life (high reliability), passive technology, that is, no need for on-board electronics for operation, ease of implementation at large distances (longer than 20 km) without any need of a repeater for automation systems (simple telemetry at large distances), being immune to EMI/RFI noise, are of small size, operate at high temperatures and are naturally explosion-proof (low intensity laser beam approximately lower than 100 mW).

Among the available optical sensor technologies the state-of-the-art technique known as Fiber Bragg Gratings (FBG) is interesting in view of the possibility of combining a huge variety of transducers (pressure, temperature, pH, position, flow rate, etc) in a single fiber. Fiber Bragg gratings are fairly suitable to be used as sensing elements. When a Bragg grating receives a broadband (C1+C2) beam of light (laser), it reflects a narrow light band in a certain wavelength. However, the mensurands (physical parameters), such as the change in strain induced by a change in pressure or in the outer temperature, yield a change in the refractive index (temperature) and in the geometric spacing of the grating, which leads to a change in the wavelength values of the light reflected by the gratings. The magnitude of the mensurands is directly related to the wavelength reflected by the Bragg grating and can be determined by detecting the wavelength change of the reflected light.

Optical fiber sensors are optical sensors using fibers as the connecting medium for light between the mensurands (temperature/pressure) and the measurement region.

Thus, the principle for the measurement of pressure and temperature using optical fiber sensors involves injecting light using a broadband laser source through the optical fiber up to the grating and at the outlet, evaluating the main features of the returned light/wavelength and intensity that have been altered by the medium.

Among the measurement technologies, Fiber Bragg Gratings (FBG) is the one of highest potential for multifunctional and nearly distributed sensor systems for applications in the permanent downhole and reservoir monitoring.

The concept at the basis of the FBG technique is that upon designing a localized grating in a certain region of the fiber, typically of 1 to 10 mm length, according to a pre-defined wavelength, a certain wavelength of the incident light is affected (FBG filter). As a result of the medium perturbations, a change is caused in the absolute value of the wavelength, directly related to the physical parameters at the origin of such change.

Optical sensors represent a breakthrough relative to state-of-the-art systems, as have been the present quartz (PDG) sensors relative to the first strain-gauge sensors during the evolution of such systems.

The main feature of the optical sensor is the fact that it is completely passive, that is, it does not need any on-board electronics for the transduction of the measured parameter, needing only a mechanical element coupled to the FBG element, which is the fiber itself. All the electronics and optical source are placed at the surface, being easily replaced in case of failure or updated without any well work-over. The increased reliability of downhole sensors means, besides the economical advantage, the viability of other technologies, such as smart completion, reservoir monitoring (HtxHp—High temperature, high pressure wells) and artificial lift.

Optical sensors can be classified as extrinsic and intrinsic. In the first category are those where the fiber is used just to guide the light and the optical effect to be measured occurs out of the fiber. In the second case the fiber serves also as the medium where the coupling between the mensurand and the fiber occurs, this rendering this category of sensors mechanically more attractive.

Sensors can also be categorized as for the optical effect to be measured, including a change in intensity, in the polarization, in the spectrum or in the phase of the light wave.

The main features of the optical-technology sensors are:

Interferometric: those are made up of mechanical systems (microoptics), being susceptible to high intensity mechanical vibrations; do not allow multi-point installation nor high vibrations, have low reliability and high cost.

Single point FBG: do not allow multiplexing, rendering difficult downhole installation because of the number of required penetrations, are not temperature limited (above up to 150° C.).

The multi-point FBG technology, besides the above features, encompasses the possibility of placing multiple kinds of sensors connected to a single fiber (multiplexed) and placed at specific points, and further having lower cost as compared to state-of-the-art sensors.

The recent patent literature points out a few relevant documents on the multi-point FBG technology.

Thus, U.S. Pat. No. 6,016,702 teaches a pressure sensor with temperature compensation for a point where an optical fiber is attached onto a compressible bellows in a location along the fiber and to a rigid structure at a second location along said fiber, with a Bragg grating contained in the fiber between these two fiber attachment locations, the grating being under tension. As the bellows structure is compressed as a result of a change in the outer pressure, the tension on the fiber grating is reduced, this causing a change in the wavelength of the light reflected by the grating. However, temperature compensation should be carried out by isolating the temperature-monitoring grating in a pressure-isolated chamber, this adding costs to the equipment.

The sensor proposed in the '702 patent can be used alone or as a plurality of sensors, serially connected along a single optical fiber. Upon mounting the sensors in series, the optical fiber crosses a passage at the end of a bellows structure for interconnection to the following pressure sensor. The several pressure and temperature signals from the multiple pressure sensors can be differentiated using wavelength division multiplexing (WDM). Thus, each Bragg grating operates at a central wavelength λ within a wave amplitude ω that is not superimposed to the amplitude of the other Bragg grating sensors. Therefore, optical signals for the temperature and pressure of each of the sensors serially connected can be easily differentiated on the basis of the received wavelength. TDM (Time Division Multiplexing) techniques can also be used to differentiate among optical signals of different Bragg grating sensors. However, the sensor of said U.S. patent does not describe nor suggest the transducer proposed in the present application, said transducer using two Bragg gratings in a same optical fiber and having at least one of the gratings attached onto an elastic membrane.

The fiber grating pressure sensor technology taught in U.S. Pat. No. 6,278,811 comprises a pressure-detection device that can be elastically strained as a function of the applied pressure, and an optical fiber that is wrapped at least once around said device and where at least a portion of its length is fused to the device, so that the elastic deformation of the device generates a corresponding axial strain along a longitudinal axis of the fiber caused by the applied pressure. The shape of the device may be a solid cylindrical shape or either has an axial orifice formed therein. The fiber contains at least one grating impressed therein. The grating has a characteristic wavelength that changes with the applied pressure. The device is made of silica or quartz. The technology described in said patent can be used as a single sensor or as a plurality of distributed or multi-point sensors.

U.S. Pat. No. 6,519,388 teaches a Bragg grating configuration that allows the grating to be used in compression without requiring optical pins or a mechanical support structure and/or that is suitable for reducing the core to cladding coupling. According to the technology taught in this U.S. patent, a tube-encased optical fiber containing a Bragg grating comprises an optical fiber having at least one Bragg grating embedded therein, and a tube, the optical fiber and the Bragg grating being encased therein along a longitudinal axis of said tube, the tube being fused to at least a portion of the fiber in a location where at least a portion of the Bragg grating is located. The tube is made of a glass material and fused to the optical fiber on opposite axial sides of the Bragg grating. The encased grating allows the grating to be compressed without buckling the fiber.

U.S. patent application 2002/0194917, now U.S. Pat. No. 6,668,656, refers to a pressure fiber grating sensor including an optical sensing element which includes an optical fiber having a Bragg grating impressed therein which is encased within and fused to at least a portion of a glass capillary tube. A temperature Bragg grating can be used for the measurement of temperature and allow the temperature-corrected pressure measurement. The sensor can be suspended in the interior of an outer cladding by a fluid, spacers or other means.

U.S. Pat. No. 6,439,055 teaches a pressure sensor assembly for assessing the pressure of a fluid in a harsh environment including a pressure sensor suspended within a fluid filled housing. The assembly includes a pressure-transmitting device, which transmits the pressure of the fluid to sensor and keeps the fluid within the housing in a void free condition. The pressure sensor assembly maintains the sensor in a near zero base strain condition and further protects the sensor from shock and vibration. The pressure sensor assembly further includes bumpers that limit the movement of the sensor within the housing.

U.S. patent application 2003/0094281, now U.S. Pat. No. 6,913,079, teaches a monitoring system and method for monitoring a predetermined set of physical characteristics associated with a structure using the monitoring system. The system is distributed in the structure and comprises a distributed optical sensing device, further comprising a fiber optic cable; a light source operatively in communication with the fiber optic cable; a light detection device, operatively in communication with the fiber optic cable, for measuring the light received at the light detection device from the fiber optic cable; and a data processor capable of using the light measured to calculate a predetermined set of physical parameters describing the predetermined set of physical characteristics.

SUMMARY OF THE INVENTION

In spite of the existing developments in the technologies of single and multi-point pressure transducers using Fiber Bragg gratings, there is still the need for an optical transducer for the simultaneous measurement of downhole pressure and temperature, said transducer comprising at least two Bragg gratings in the same optical fiber, wherein one of the gratings, which is compatible with the operation temperature, is attached onto an elastic membrane, the attachment assuring that the membrane conveys efficiently to one Bragg grating the strains undergone by such membrane resulting from pressure and temperature changes, while the other Bragg grating is attached or not to the membrane, such transducer being described and claimed in the present application.

Broadly, the invention is directed to an optical pressure and temperature transducer for the simultaneous measurement of downhole pressure and temperature, said transducer being part of a system that comprises a light emitter that propagates light along the core of an optical fiber containing Bragg gratings impressed in the same, until the light meets a Bragg grating that reflects a portion of said light, said transducer comprising a predominantly cylindrical body, including an elastic membrane for attaching at least one Bragg grating, and at least one more Bragg grating impressed on the same optical fiber, and wherein said body is:

a) Bored along the main axis in order to allow the passage of an optical fiber and assure access to both ends of the said optical fiber;
b) Provided with two symmetry planes in order to facilitate installation and serial connection with other sensors of the same kind or other optical fiber transducers and sensors;
c) Provided with a central access and respective sealing, perpendicular to the main axis of said body, on the opposite side of said membrane, to allow the attachment of at least one Bragg grating to the membrane; and
d) Provided with sealing means against the outer pressure, at the inlet and at the outlet of the optical fiber and in the central cylindrical bore, whereby the elastic membrane conveys the strain that is proportional to the pressure and temperature conditions to which is submitted the transducer having at least one Bragg grating, the portion of non-reflected light by the Bragg gratings following along the remaining length of the optical fiber, where said fiber can be utilized to interrogate other sensors and transducers connected along the same optical fiber or in one or more optical fibers coupled to said one.

The method for the simultaneous measuring of borehole temperature and pressure using the inventive transducer comprises providing an optical fiber containing at least two Bragg gratings sensitive respectively to temperature and pressure; causing a change in the refractive index of the gratings and strain in the elastic membrane resulting from the temperature and pressure conditions to which the transducer is subjected through the elastic membrane; conveying the change in refractive index of the grating caused by the change in the outer temperature and the strain caused in the grating by the change in outer pressure; from the measurement of the changes in the values of Bragg grating wavelength, recovering the value of the pressure and temperature by means of a calibration curve.

Thus, the invention provides an optical transducer for the simultaneous measurement of downhole pressure and temperature that utilizes two Bragg gratings contained in the same optical fiber.

The invention provides further an optical transducer for the simultaneous measurement of downhole pressure and temperature where at least one Bragg grating impressed on an optical fiber is attached on an elastic membrane.

The invention provides further an optical transducer for the simultaneous measurement of downhole pressure and temperature where the portion of light not reflected by the Bragg gratings of said transducer follows along the remainder of the said optical fiber, to other sensors and transducers connected along the same optical fiber or to one or more optical fibers coupled to the same.

The invention also provides a method for the simultaneous measurement of downhole pressure and temperature using the described optical transducer.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE PREFERRED MODES

The invention is directed, therefore, to an optical transducer for the simultaneous measurement of downhole pressure and temperature comprising a predominantly cylindrical body, bored along the main axis to allow the passage of an optical fiber, said transducer having two symmetry planes and a central cylindrical bore for attachment of at least one Bragg grating, and sealing means against the outer pressure at the inlet and the outlet of the fiber and in the central cylindrical bore.

The main feature of the sensor construction is the way of mechanical transduction of the physical parameters pressure and temperature into wavelength change. Such transduction is carried out by means of the mechanisms of temperature and pressure.

In the present specification, the following terms have the meaning as detailed below.

Transducer, according to the metrology vocabulary, should be understood as the element that effects the transduction (conversion) of a physical parameter into another (Pressure/Temperature into Wavelength Change of the Optical Signal)

According to the same glossary, sensor means the element that undergoes the change/transformation as a function of the change in any physical parameter.

One aspect of the invention is an optical transducer for the simultaneous measurement of pressure and temperature under downhole operation conditions, useful for single point configuration.

Another aspect of the invention is an optical transducer for the simultaneous measurement of pressure and temperature under downhole operation conditions, useful for multi-point configuration.

The transducer of the invention uses the FBG technology.

The Bragg gratings are designed so as to produce a periodic modulation in the refractive index of the optical fiber core along the length of said fiber. The grating reflects a range of wavelength whose value at the peak of the spectrum, $\lambda_B$, corresponds to nearly three times the value of the spatial period $\Lambda$ of the index modulation, according to $\lambda_B = 2n\Lambda$, with n≈1.5 being the refractive index of the optical fiber core.

The behavior of the Bragg gratings is similar to that of a resonating filter system, that is, the wavelength values satisfying the resonance condition are affected while the remaining are ignored.

The Bragg gratings useful for the purposes of the invention comprise the gratings prepared prior to their installation in the pressure and temperature transducer.

The Bragg grating is prepared by locally exposing the optical fiber core to an interference pattern of two ultraviolet light beams so oriented relative to the optical fiber longitudinal axis that, for the grating, the maxima and minima of the interference pattern extend along a small portion of the optical fiber in directions normal to the longitudinal axis and that the periodicity is that desired for the particular grating.

The sensor is made up of a monomode optical fiber usually for a wavelength in the range of 1,300 nm to 1,550 nm containing the FBG impressed in the fiber core at any position along the fiber.

The FBG mechanically coupled to the transducer is interrogated using an optical system made up of a source of light—that can be a broadband (C1+C2) or a tunable laser or either a source of light with a broad emission band such as a LED or an ASE source—coupled to the fiber core, and a Bragg wavelength measurement system—that can be a spectrum analyzer or a wavelength measurement system, or either through intensity change (convolution of the FBG signal with that of the fixed filter of same wavelength at the surface).

For measuring the signal, transmission or reflection can be used. For downhole applications or any difficult access equipment, the measurements are run in reflection. Based on the measurement of the Bragg wavelength of the grating, the desired mensurand value is recovered through a calibration curve that should be drawn in the laboratory prior to installing the sensor in the field.

The optical pressure and temperature transducer uses as sensor element for both parameters, optical fibers containing Bragg gratings (FBG). The relevant parameter to be measured is the spectral position of the reflection peak for determining the wavelength of the return signal characteristic of each sensor, such signal depending in a known manner on the strain condition and temperature to which is submitted the FBG. The pressure is obtained by measuring an optical fiber containing an FGB, attached onto a membrane designed to be strained within the elastic limit of the metal used to make it, and at the operation range designed for the transducer. Such sensor is submitted to the effects of pressure and temperature, with the second effect being necessarily compensated so as to isolate the portion relative to pressure.

According to the invention, the optical transducer for the simultaneous measurement of downhole pressure and temperature using an optical fiber containing two Bragg gratings, wherein at least one of such gratings is attached on an elastic membrane comprises two modes.

Thus, a first mode comprises one of the gratings attached onto the membrane, generally at the center of the membrane, while the other grating is placed out of the membrane. In this way, the grating, which is out of the membrane, is submitted to the effect of temperature only. When the outer pressure increases, the membrane is strained and stretches the fiber in the region of the Bragg grating, causing a strain along the main axis of the optical fiber. This is what it is desired to measure. The change in the Bragg grating wavelength is proportional to the strain and is also proportional to the temperature. If there is only one grating it is not possible to determine how much of the wavelength change is due to the temperature and how much is due to the pressure.

Therefore the option is to have a second grating, which would not depend on pressure but on temperature only. In order to make it work, the temperature at both locations of the sensor should be the same.

The equation describing such a system is equation (1) below.

$$\Delta\lambda_1 = f_1(P) + g_1(T) \qquad (1)$$

$$\Delta\lambda_2 = g_2(T).$$

However, mainly when there are transitions from one temperature to the other, the temperature values in the two gratings are different. The temperatures will be the same only after being evened.

One of the drawbacks to implement such mode is the calibration, which can be slow until attaining the temperature evenness in the two gratings. The membrane is very thin, and the stabilization brought by the outer temperature is quicker. The temperature grating is more distant from the outer medium and takes longer to stabilize. The temperature is measured by means of another FBG mechanically decoupled from the transducer body. This second sensor is attached onto a small metallic anchoring part.

In order to try to overcome the drawback of the temperature evenness a second mode of the optical transducer of the invention comprises attaching both Bragg gratings to the membrane.

The attachment by means of an adhesive or any other device should be carried out so that one of the gratings is at the center of the membrane as in the first mode, while the second grating is necessarily placed out of the center. Both gratings undergo the effect of pressure, only at different intensities. However, the effect of the temperature is the same for both gratings.

The equation of the second mode of the optical transducer is equation (2) below:

$$\Delta\lambda_1 = f_1(P) + g(T) \qquad (2)$$

$$\Delta\lambda_2 = f_2(P) + g(T)$$

As can be seen from equation (2), the difference between $\Delta\lambda$s depends only from P, and a $f_3(P)$ will be obtained, which is determined through calibration, the substitution being made in $\lambda_1$ or $\lambda_2$.

Such approach assures that both gratings are always at the same temperature, this allowing the correct simultaneous measurement of pressure and temperature. Even if the parameter "g" were not the same for both equations, the mathematical solution would be possible, but "g" being the same makes the solution easier.

The behavior of Temperature and Pressure according to this mode is outlined below.

Temperature: the FBG grating responsible for the temperature measurement can be coupled according to two ways: (i) encapsulated in a metallic tube housed in the interior of the sensor body, in close proximity to the membrane. The metallic tube performs the thermal coupling between the temperature of the medium and the temperature of the grating; (ii) attached onto the membrane together with the pressure grating.

This latter configuration improves the thermal coupling between the temperature sensing grating and the measurement of pressure of the outer medium, such measurement being required to correct the measurement of pressure transduction (pressure vs. change of the pressure grating wavelength).

Such configuration effectively corrects (cancels) the effects of the temperature change on the pressure grating.

Pressure: The FBG grating is responsible for the transduction of the pressure change of the outer medium, which results in a membrane strain, the membrane in turn conveying such strain to the pressure grating. Such strain on the grating shifts the wavelength in a way that is related to pressure strains. Since the thermal effects affect the wavelength, measurements should be corrected in view of such effects (thermal changes) undergone by the pressure grating.

Processing of the temperature measurement is carried out by means of the measurement of the wavelength change, since the value of the wavelength measurement impressed under ambient temperature conditions is known. Therefore the changes are computed and corrected using a simple algorithm for transforming the wavelength changes into temperature degrees. Such algorithm calculates the temperature on the basis of the constants of the temperature calibration of the sensor.

Processing of the pressure measurement is carried out by measuring the wavelength change, since the value of the wavelength measurement impressed under ambient temperature and atmospheric pressure conditions is known. Therefore the changes are computed and corrected using a simple algorithm that corrects the temperature changes in the wavelength by measuring the changes in wavelength as a function of the pressure/strain of the outer membrane (indirect measurement). This algorithm calculates the pressure on the basis of the constants of pressure calibration (membrane construction) of the sensor.

In both modes described below for the pressure and temperature transducer, the elastic membrane is a thin membrane, the thickness of which is a function of the measurement range of the mensurand. The thickness of the elastic membrane is homogeneous. Alternatively, the thickness is variable throughout the membrane.

The invention will be described below with reference to the attached Figures.

Figures 1A, 1C:
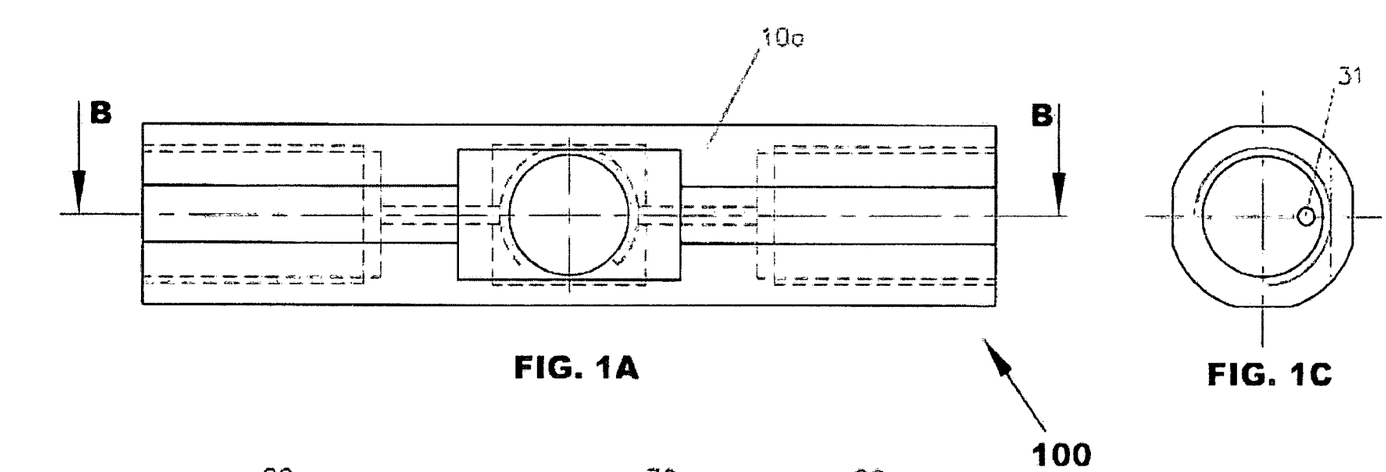
FIG. 1A attached illustrates a top view of one mode of the optical transducer according to the invention where a Bragg grating is attached onto the elastic membrane and the other Bragg grating is out of the membrane.
FIG. 1C attached is a side view of the same transducer.

FIG. 1A illustrates an upper view of one mode of the optical transducer according to the invention where one Bragg grating is attached on the elastic membrane and the other Bragg grating is out of the membrane. This mode of the present transducer, generally designed by numeral 100, comprises a body 10a, bored along the main axis to allow the passage of an optical fiber 30 so as to secure access to both ends of the said optical fiber 30.

The body 10a is provided with: (i) two symmetry planes for making it easier for the sensor to be installed and serially connected to other sensors of the same kind or other transducers and optical fiber sensors; (ii) an elastic membrane 50 and attached on said membrane, at least one Bragg grating 60a, 60b contained in the optical fiber 30; and (iii) a longitudinal passage 31 for the optical fiber 30 throughout the transducer body 10a.

The elastic membrane 50 is a thin plate in the transducer body 10a.

Alternatively, the elastic membrane 50 is not an integral part of the body 10a of transducer 100 and is attached onto said body by means of any known device.

Figure 1B:
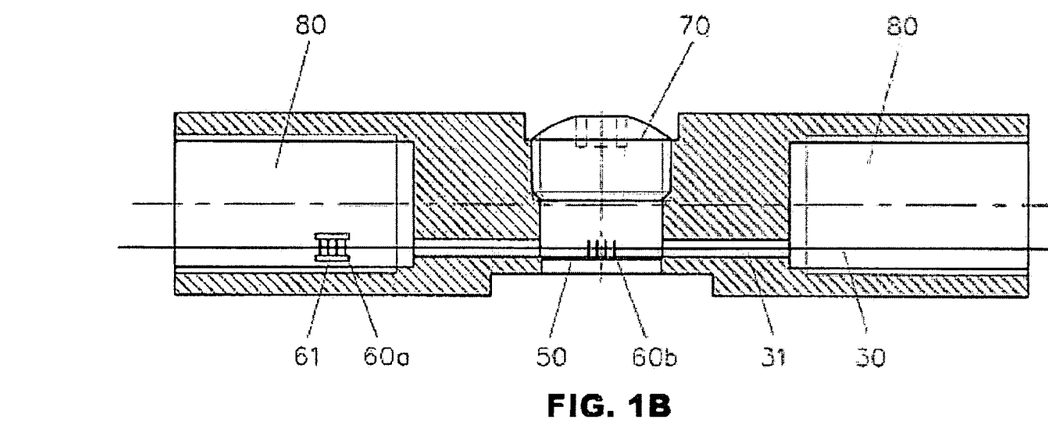
FIG. 1B attached is a cut along the BB axis of the same transducer.

The sealing means for effecting the sealing in the cross-section direction of the optical transducer 100 is a circular stop or sealing 70, illustrated in FIG. 1B.

For the setting up of transducer 100, the Bragg grating 60a contained in optical fiber 30 is attached onto elastic membrane 50 by means of any attaching device, such as by gluing with a polymeric adhesive, and then the stop 70 is screwed in body 10a to achieve the sealing. Thus, stop 70 generally makes easier the setting up of the optical transducer 100.

FIG. 1C is a side view of the same transducer, with the longitudinal passage 31 for optical fiber 30.

The interior of the body 10a is fitted with a chamber 80 for accommodating sealing means (not represented), designed for sealing transducer 100 from the outer medium. In transducer 100, the optical fiber 30 crosses said sealing means and the longitudinal passage 31 of the body 10a, so that at the end of the setting up, transducer 100 with the optical fiber 30 containing the Bragg gratings 60a, 60b is tight. Alternatively, if transducer 100 is used without being connected to any other transducer, one of its ends is completely sealed by a cap (not represented).

Figure 2A:
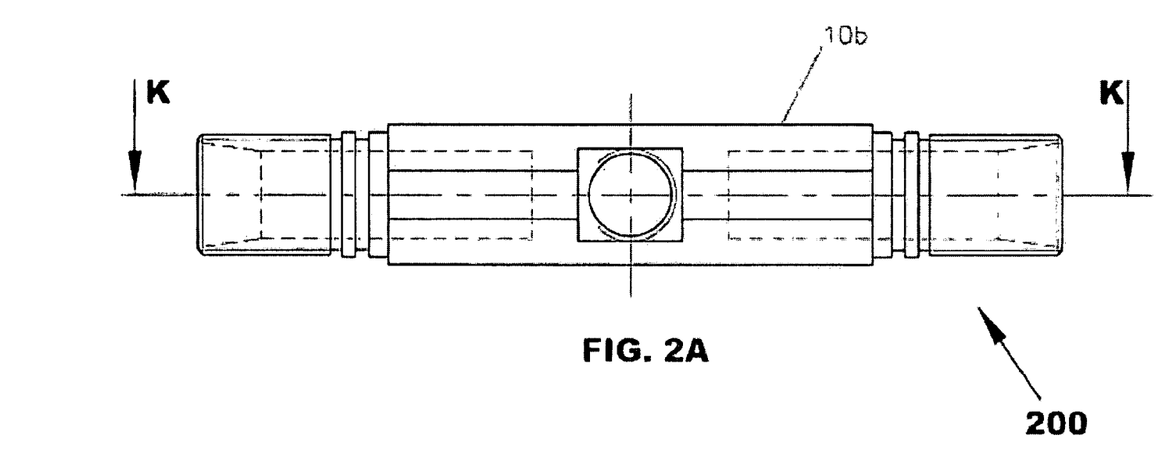
FIG. 2A attached illustrates a top view of another mode of the optical transducer of the invention.

FIG. 2A illustrates an upper view of another mode of the optical transducer of the invention. The transducer, generally designed by numeral 200, is made up of a cylindrical body 10b.

Transducers 100 and 200 differ only by the configuration to be coupled to outer sealing means.

Figure 2B:
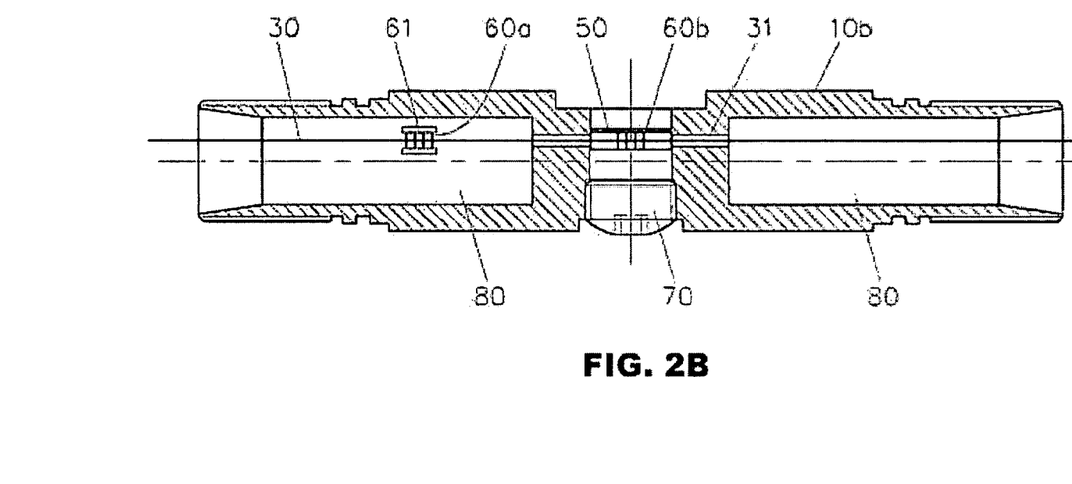
FIG. 2B attached is a cut along the BB axis of the same transducer.

FIGS. 1B and 2B are BB and KK cuts, respectively, that illustrate modes of the transducer 100, 200 of the invention with a Bragg grating 60b designed for the measurement of pressure attached onto the elastic membrane 50 and another Bragg grating 60a designed for the measurement of temperature being not attached onto the said membrane 50. In this mode, grating 60a is protected by a metallic shield 61, which also increases the effect of temperature experienced by grating 60a.

Alternatively, metallic shield 61 is dispensed with and fiber 30 is encapsulated in a protecting tube (not represented).

Figure 2C:
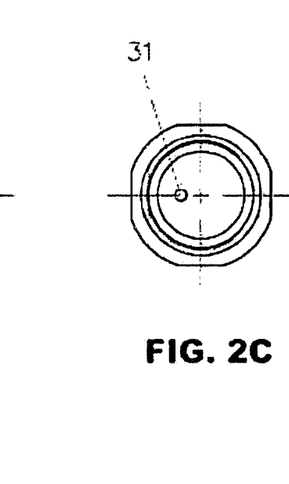
FIG. 2C attached is a side view of the same transducer.

FIG. 2C is a side view of transducer 200 with the passage 31 of the optical fiber 30.

Figure 2D:
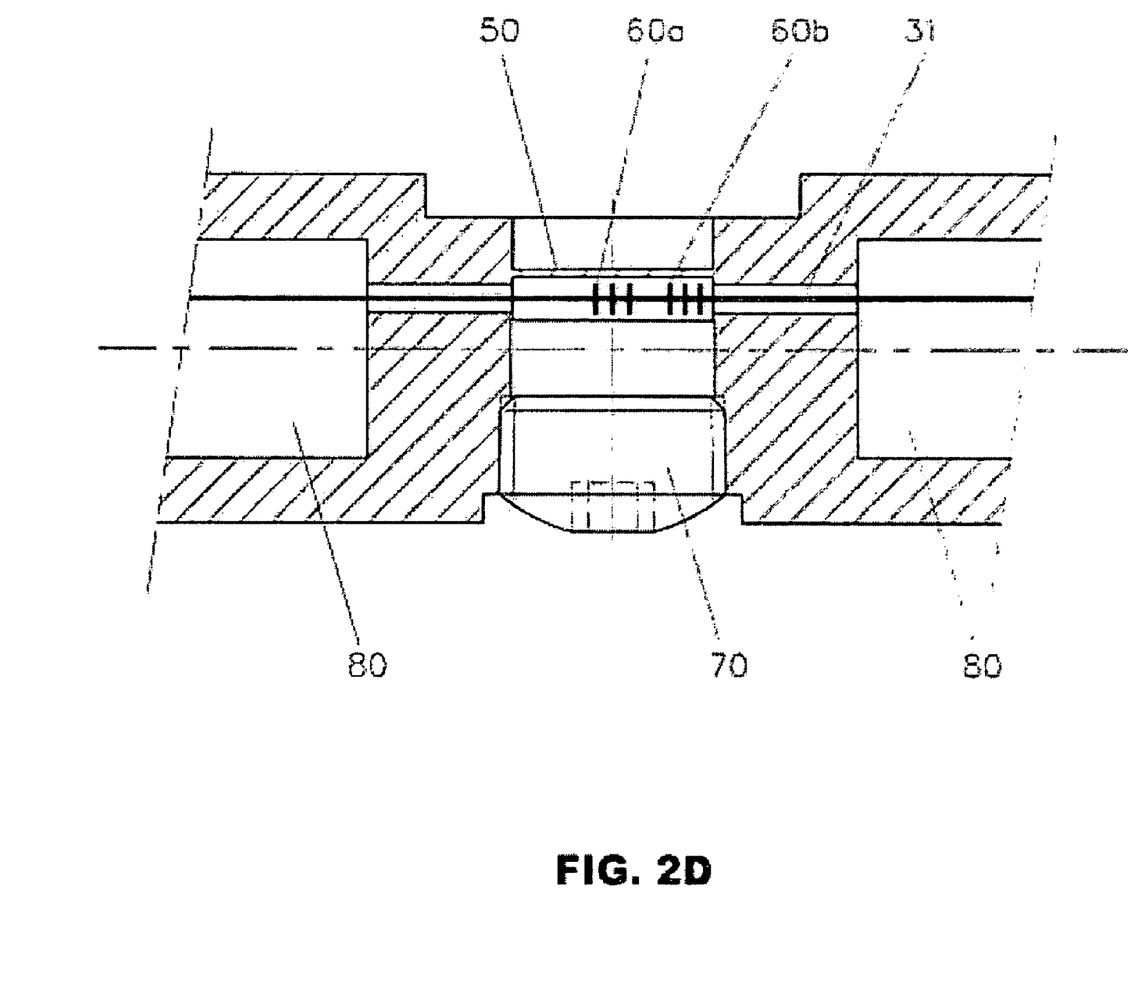
FIG. 2D attached illustrates one mode of the same transducer where the two Bragg gratings are attached onto the elastic membrane.

FIG. 2D illustrates one mode of transducer 100 having both Bragg gratings 60a, 60b contained in the same optical fiber 30 attached onto elastic membrane 50. In this mode, one grating 60a is attached at the center of the membrane 50 and another grating 60b is attached so as to be out of the center of membrane 50.

Figure 3:
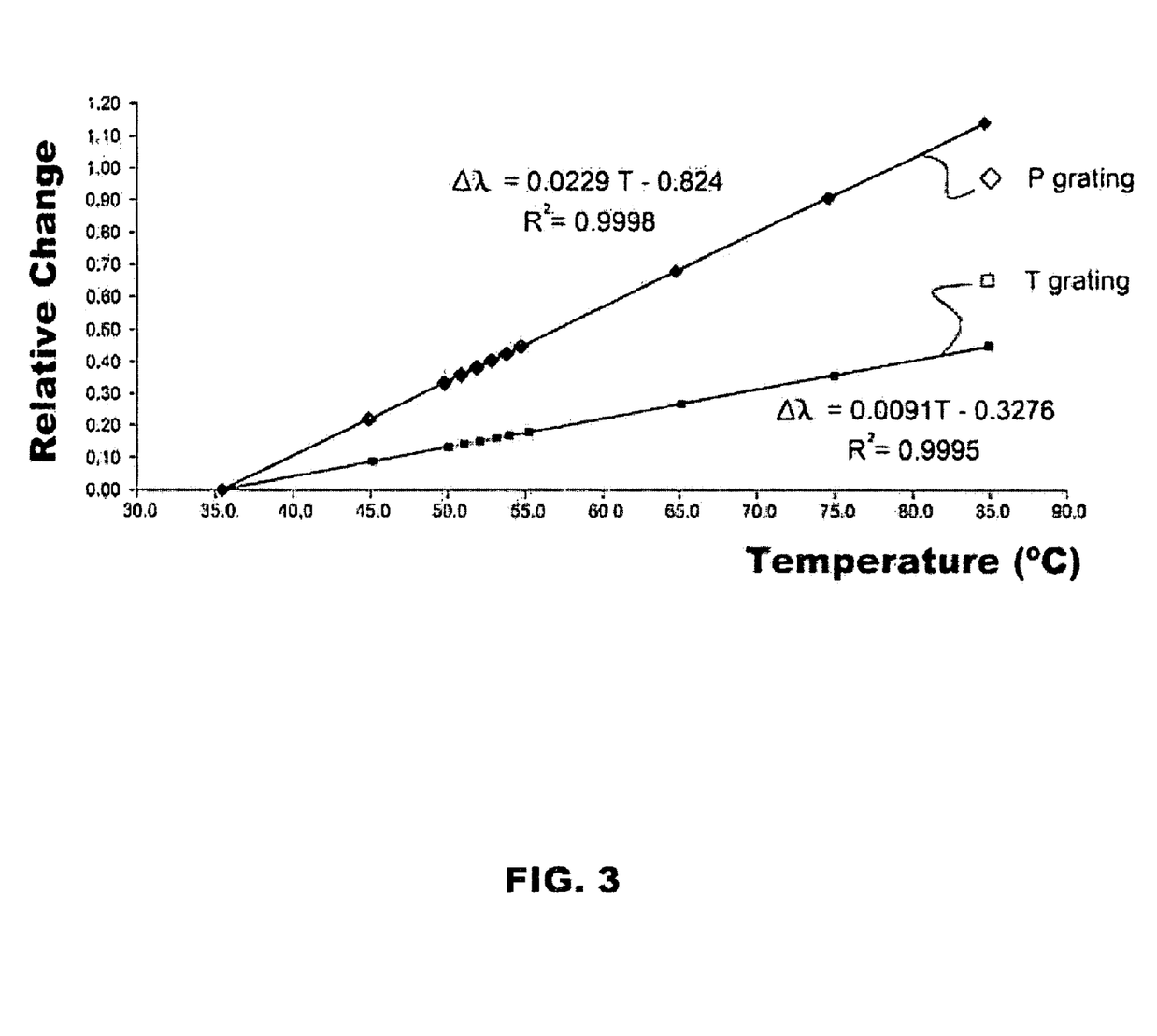
FIG. 3 attached illustrates a graph of the calibration of the inventive transducer for the temperature grating.
Figure 4:
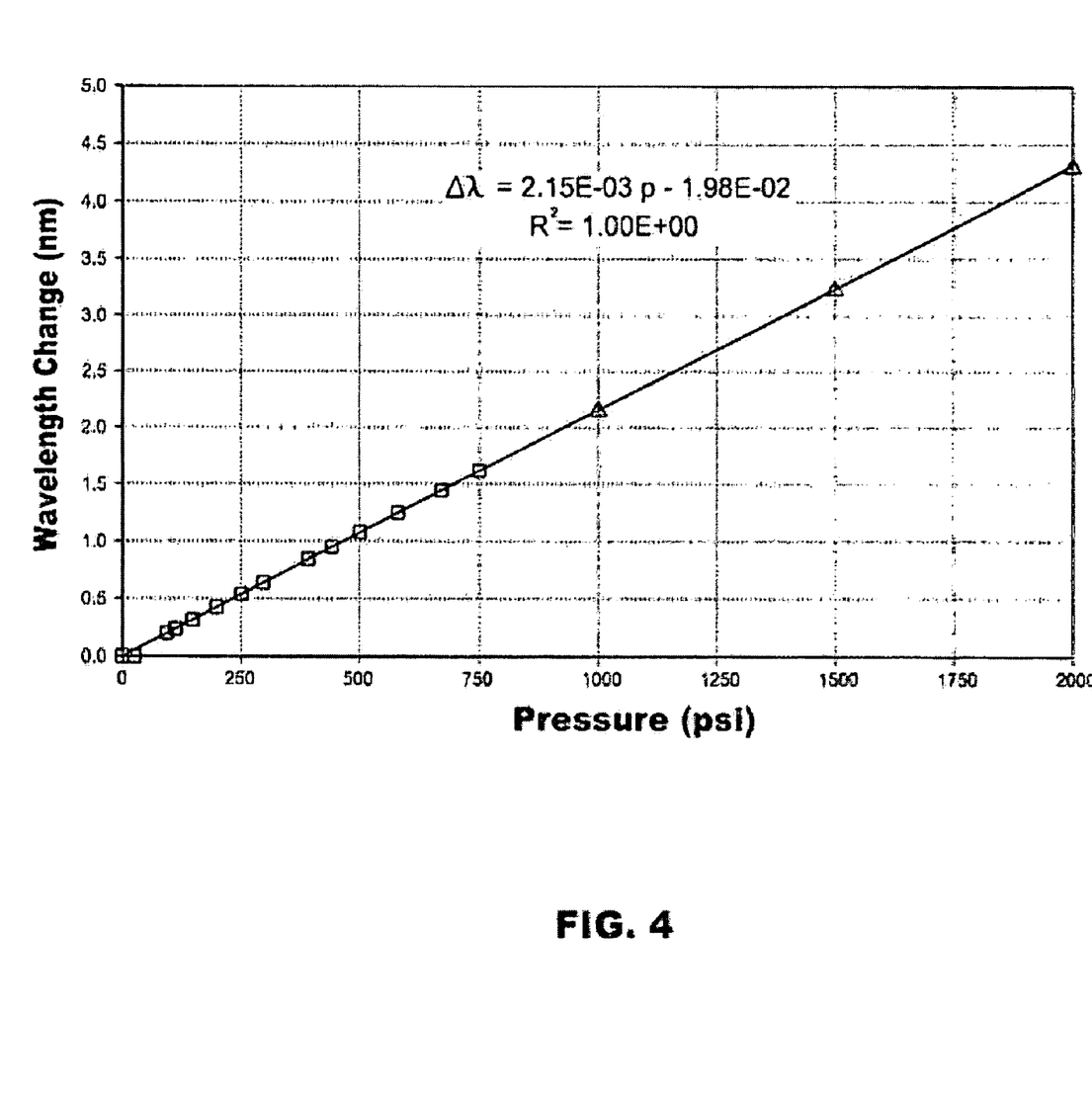
FIG. 4 attached illustrates a graph of the calibration of the inventive transducer for the pressure grating.

FIGS. 3 and 4 refer to the calibration of transducer 100 of the invention. Broadly, it is observed that the change in reflection wavelength for transducer 100 shows a linear behavior of the wavelength change as a function of the physical parameters (temperature and pressure) when one of the mensurands, pressure or temperature, is changed while the other one is kept constant.

FIG. 3 illustrates a graph of the calibration of the inventive transducer for the temperature grating. This Figure illustrates the dependencies of the wavelengths of the pressure and temperature sensors. Excellent linearity is observed, besides a higher sensitivity for the sensor attached onto the membrane. This is due to the addition of the effects of higher refractive index of the fiber, present in both sensors, and the thermal expansion of the membrane material.

FIG. 4 illustrates a graph of the transducer calibration for the pressure grating based on a measurement system employing the measurement of the wavelength change.

The values of wavelength change making up the graph illustrated in FIG. 4 include measurements carried out at 25, 34, 45 and 76° C. using a measurement system based on wavelength change. Thus the illustrated data demonstrate that transducer 100 did not show any hysteresis and that its response is linear, the sensitivity being independent of temperature.

The configuration of sensors 100, 200 illustrated in FIGS. 1A, 1B, 1C and 2A, 2B, 2C and 2D allows a plurality of said transducers 100, 200 having at least one Bragg grating 60b attached onto an elastic membrane 50 to be serially connected by means of the commonly shared optical fiber 30 so that multiple pressure and temperature sites can be measured in the mode of distributed sensors. Any multiplexing techniques can be employed for distinguishing the signal of one sensor from the signal of another one, such as wavelength-division multiplexing (WDM) or time-division multiplexing (TDM), or any other multiplexing techniques. In this case, the grating 60a, 60b in each sensor can have a different reflection wavelength.

The invention claimed is:

1. An optical transducer for the simultaneous measurement of downhole pressure and temperature, said transducer being inserted in a system comprising a light emitter, an optical fiber containing Bragg gratings, the emitted light propagating along the core of said optical fiber until said light meets a Bragg grating able to reflect a portion of said light, wherein said transducer comprises a predominantly cylindrical body, including: a) a membrane designed for pressure measurement; b) at least one Bragg grating designed for pressure measurement attached to said elastic membrane; and c) at least one Bragg grating for temperature measurement; wherein said gratings are in the same optical fiber, and wherein said body has:
   a) a bore along a main axis coaxial with or parallel to a longitudinal axis thereof to allow the passage of said optical fiber therethrough so as to secure access to both ends of said optical fiber;
   b) two symmetry planes in order to facilitate installation and connection in series with other optical fiber transducers and sensors;
   c) a central access and respective stop, perpendicular to the main axis of said body, on an opposite side of said membrane with respect to said optical fiber, to allow the attachment of at least one Bragg grating to said membrane; and
   d) sealing means against the outer pressure, at the inlet and at the outlet of the bore, whereby the membrane conveys a strain that is proportional to the pressure and temperature conditions to which the transducer is exposed, the portion of non-reflected light by the Bragg gratings continuing along the remaining length of the optical fiber.

2. An optical transducer according to claim 1, wherein said transducer is connected in series to at least one other transducer through the common optical fiber in order to effect measurement of multiple pressure and temperature locations in the mode of distributed sensors.

3. An optical transducer according to claim 1, wherein said transducer is connected in series to other transducers and sensors of the same kind.

4. An optical transducer according to claim 1, wherein the Bragg grating for temperature measurement is remote from said membrane.

5. An optical transducer according to claim 4, wherein a metallic shield protects the Bragg grating for temnerature measurement.

6. An optical transducer according to claim 4, wherein a protecting tube encapsulates the Bragg grating designed for temperature measurement.

7. An optical transducer according to claim 1, wherein the Bragg grating for temperature measurement is attached onto the membrane.

8. An optical transducer according to claim 7, wherein the effect of temperature is the same for both Bragg gratings attached onto the membrane.

9. An optical transducer according to claim 1, wherein the Bragg grating for pressure measurement is attached onto the membrane by gluing with a polymeric adhesive.

10. An optical transducer according to claim 1, wherein the body comprises symmetrical chambers, designed to accommodate said sealing means against the outer pressure.

11. An optical transducer according to claim 1, wherein the thickness of the membrane is uniform.

12. An optical transducer according to claim 1, wherein the thickness of the membrane is variable.

13. An optical transducer according to claim 1, wherein the membrane is integral with the body.

14. A method for the simultaneous measurement of downhole temperature and pressure with the aid of the optical transducer for the simultaneous measurement of downhole pressure and temperature, said transducer being inserted in a system comprising a light emitter, an optical fiber containing Bragg gratings, the emitted light propagating along the core of said optical fiber until said light meets a Bragg grating able to reflect a portion of said light, wherein said transducer comprises a predominantly cylindrical body, including: a) a membrane designed for pressure measurement; b) at least one Bragg grating designed for pressure measurement attached to said membrane and c) at least one Bragg grating for temperature measurement; wherein said gratings are in the same optical fiber and said body has:
   a) a bore along a main axis coaxial with or parallel to a longitudinal axis thereof thereby to allow the passage of said optical fiber therethrough so as to secure access to both ends of said optical fiber;
   b) two symmetry planes in order to facilitate installation and serial connection with other optical fiber transducers and sensors;
   c) a central access and respective stop, perpendicular to the main axis of said body, on an opposite side of said membrane with respect to said optical fiber, to allow the attachment of said at least one Bragg grating to said membrane; and
   d) sealing means against the outer pressure, at the inlet and at the outlet of the bore, whereby
   the membrane conveys a strain that is proportional to the pressure and temperature conditions to which the transducer is exposed, the portion of non-reflected light by the Bragg gratings continuing along the remaining length of the optical fiber,
wherein said method comprises:
   a) providing an optical fiber containing at least two Bragg gratings, said gratings being sensitive respectively to temperature and pressure;
   b) attaching at least one grating to said member, the refractive index of said gratings and a strain in said membrane changing according to temperature and pressure conditions to which said transducer is exposed;
   c) conveying the temperature (refractive index) change and strains (spatial geometry of the grating) to said Bragg gratings through said membrane;
   d) propagating light along the core of the optical fiber;
   e) measuring Bragg wavelength changes; and
   f) recovering the temperature and pressure values from said measured Bragg wavelength by means of a calibration curve.

15. An assembly of a plurality of transducers serially connected through a common optical fiber containing a plurality of Bragg gratings in a system comprising a light emitter and said optical fiber, the emitted light propagating along the core of said optical fiber until said light meets a Bragg grating able to reflect a portion of said light, each said transducer comprising a predominantly cylindricaly body,
  including a membrane designed for pressure measurement, and at least one Bragg grating designed for pressure measurement attached to each said elastic membrane, and wherein each said transducer body has:
  a) a bore along a main axis coaxial with or parallel to a longitudinal axis thereof thereby to allow the passage of said optical fiber therethrough;
  b) two symmetry planes in order to facilitate installation and serial connection with other optical fiber transducers and sensors;
  c) a central access and respective stop, perpendicular to the longitudinal axis of said body, on an opposite side of said elastic membrane with respect to said optical fiber, to allow the attachment of said at least one Bragg grating to said membrane; and
  d) sealing means against the outer pressure, at the inlet and at the outlet of the bore,
  whereby the membrane conveys a strain that is proportional to the pressure and temperature conditions to which the transducer is submitted, the portion of non-reflected light by the Bragg grating continuing along the remaining length of the optical fiber, and whereby the plurality of transducers measure multiple pressure and temperature locations in the mode of distributed sensors.

16. An assembly according to claim 15, wherein WDM/TDM multiplexing techniques are used to distinguish the signal of one sensor from that of another sensor.

17. An assembly according to claim 15, wherein at least two of said serially connected transducers are of the same kind.

18. An assembly according to claim 15, wherein said transducer is connected in series to transducers and sensors of different kinds.

* * * * *